(12) United States Patent
Borchers et al.

(10) Patent No.: US 11,529,938 B2
(45) Date of Patent: Dec. 20, 2022

(54) AUTOMATIC ADAPTATION OF BRAKE BOOST TO DIFFERENT BRAKING LOADS

(71) Applicant: VOLKSWAGEN AKTIENGESELLSCHAFT, Wolfsburg (DE)

(72) Inventors: Frank Borchers, Meinersen (DE); Michael Schmalbruch, Kissenbrück (DE); Leo Schineller, Wasbüttel (DE)

(73) Assignee: Volkswagen Aktiengesellschaft

( * ) Notice: Subject to any disclaimer, the term of this patent is extended or adjusted under 35 U.S.C. 154(b) by 338 days.

(21) Appl. No.: 15/753,554

(22) PCT Filed: Aug. 31, 2016

(86) PCT No.: PCT/EP2016/070503
§ 371 (c)(1),
(2) Date: Feb. 20, 2018

(87) PCT Pub. No.: WO2017/045922
PCT Pub. Date: Mar. 23, 2017

(65) Prior Publication Data
US 2018/0257617 A1    Sep. 13, 2018

(30) Foreign Application Priority Data
Sep. 18, 2015   (DE) .................... 10 2015 217 905.2

(51) Int. Cl.
*B60T 8/18* (2006.01)
*B60T 8/172* (2006.01)
*B60T 8/24* (2006.01)

(52) U.S. Cl.
CPC ............. *B60T 8/18* (2013.01); *B60T 8/172* (2013.01); *B60T 8/1837* (2013.01); *B60T 8/245* (2013.01)

(58) Field of Classification Search
None
See application file for complete search history.

(56) References Cited

U.S. PATENT DOCUMENTS 4,712,839 A * 12/1987 Brearley ............... B60T 13/662
                                                          303/174
5,002,343 A *  3/1991 Brearley ............... B60T 8/1708
                                                          188/3 R
(Continued)

FOREIGN PATENT DOCUMENTS

CN     104837695 A    8/2015
DE     19808673 A1    4/1999
(Continued)

OTHER PUBLICATIONS

English Translation of Description of CN104837695 (Year: 2019).*
(Continued)

*Primary Examiner* — David P. Merlino
(74) *Attorney, Agent, or Firm* — Barnes & Thornburg, LLP

(57) ABSTRACT

A method for operating an electromechanical brake booster. A pedal force is ascertained, a brake pressure is ascertained from the pedal force by an actuator, and the brake pressure applied to frictional brakes is set, thereby producing a vehicle deceleration. The actuator has a standard configuration wherein, in response to the pedal force, a brake pressure is ascertained that produces a specified standard deceleration of the motor vehicle if a specified disturbance variable has a specified standard value. The influence of the disturbance variable on the vehicle deceleration is compensated. The actuator has at least one control parameter for setting a compensation configuration, an actual value of the disturbance variable is detected, and the compensation con-
(Continued)

figuration is set based on the respective difference between the ascertained actual value and the standard value.

14 Claims, 1 Drawing Sheet

(56) References Cited

U.S. PATENT DOCUMENTS

| | | | | |
|---|---|---|---|---|
| 5,332,300 | A * | 7/1994 | Hartmann | B60T 8/1755 180/197 |
| 5,482,359 | A * | 1/1996 | Breen | B60T 8/58 303/9.69 |
| 5,558,409 | A * | 9/1996 | Walenty | B60T 7/042 303/155 |
| 5,568,962 | A * | 10/1996 | Enomoto | B60L 7/26 303/3 |
| 5,984,435 | A * | 11/1999 | Tsukamoto | B60T 8/17636 303/191 |
| 6,019,438 | A * | 2/2000 | Sawada | B60T 8/4872 303/114.1 |
| 6,367,889 | B1 * | 4/2002 | Tsubouchi | B60T 8/441 303/114.3 |
| 6,415,230 | B1 * | 7/2002 | Maruko | B60T 7/22 340/435 |
| 8,103,414 | B2 * | 1/2012 | Boss | B60K 28/08 701/48 |
| 8,725,324 | B2 * | 5/2014 | Jung | G01M 17/08 701/19 |
| 8,768,591 | B2 * | 7/2014 | Vollert | B60T 8/4068 303/114.3 |
| 2003/0067215 | A1 * | 4/2003 | Rieth | G05G 1/38 303/20 |
| 2004/0167705 | A1 * | 8/2004 | Lingman | G01G 19/086 701/124 |
| 2006/0076827 | A1 * | 4/2006 | Albright | B60T 8/323 303/167 |
| 2007/0262638 | A1 * | 11/2007 | Kodama | B60T 8/4872 303/9.62 |
| 2010/0049415 | A1 | 2/2010 | Bauerle | |
| 2011/0178687 | A1 * | 7/2011 | Anderson | B60T 13/745 701/70 |
| 2012/0049617 | A1 * | 3/2012 | Furuyama | B60T 13/662 303/9.75 |
| 2013/0325280 | A1 * | 12/2013 | Terasaka | B60T 8/1761 701/74 |
| 2014/0046566 | A1 * | 2/2014 | Maitlen | B60T 8/172 701/70 |
| 2015/0027823 | A1 * | 1/2015 | Murata | B60T 17/22 188/162 |
| 2015/0112567 | A1 * | 4/2015 | Toelge | B60T 13/662 701/70 |
| 2015/0239448 | A1 * | 8/2015 | O'Meachair | B60T 8/171 701/70 |
| 2015/0298670 | A1 * | 10/2015 | Ullrich | B60T 8/3655 303/155 |
| 2015/0344012 | A1 * | 12/2015 | Knechtges | B60T 13/686 701/70 |
| 2016/0046268 | A1 * | 2/2016 | Miller, Jr. | B60T 8/1708 701/80 |
| 2016/0375775 | A1 * | 12/2016 | Imanishi | B60L 7/10 701/70 |
| 2017/0182989 | A1 * | 6/2017 | Takeda | B60T 8/72 |
| 2017/0240154 | A1 * | 8/2017 | Kashiwai | B60T 13/146 |
| 2018/0015914 | A1 * | 1/2018 | Okano | B60T 13/686 |
| 2018/0141527 | A1 * | 5/2018 | Hara | B60T 8/17551 |
| 2018/0148024 | A1 * | 5/2018 | Macnamara | B60T 8/243 |
| 2018/0244158 | A1 * | 8/2018 | Komatsu | B60L 7/26 |
| 2019/0092309 | A1 * | 3/2019 | An | B60T 17/221 |
| 2019/0111900 | A1 * | 4/2019 | Engel | A01B 76/00 |
| 2019/0193569 | A1 * | 6/2019 | Oh | B60T 13/662 |
| 2020/0001841 | A1 * | 1/2020 | Green | B60T 8/18 |
| 2020/0047736 | A1 * | 2/2020 | Han | B60W 10/182 |
| 2020/0108810 | A1 * | 4/2020 | Hara | B60T 8/17551 |

FOREIGN PATENT DOCUMENTS

| | | |
|---|---|---|
| DE | 10327553 A1 | 1/2005 |
| DE | 102007054697 A1 | 6/2008 |
| DE | 102009047122 A1 | 5/2011 |
| DE | 102011017018 B3 | 7/2012 |
| DE | 102013211243 A1 | 12/2014 |

OTHER PUBLICATIONS

Search Report for German Patent Application No. 10 2015 217 905.2; dated May 24, 2016.
Search Report for International Patent Application No. PCT/EP2016/070503, dated Dec. 16, 2016.

* cited by examiner

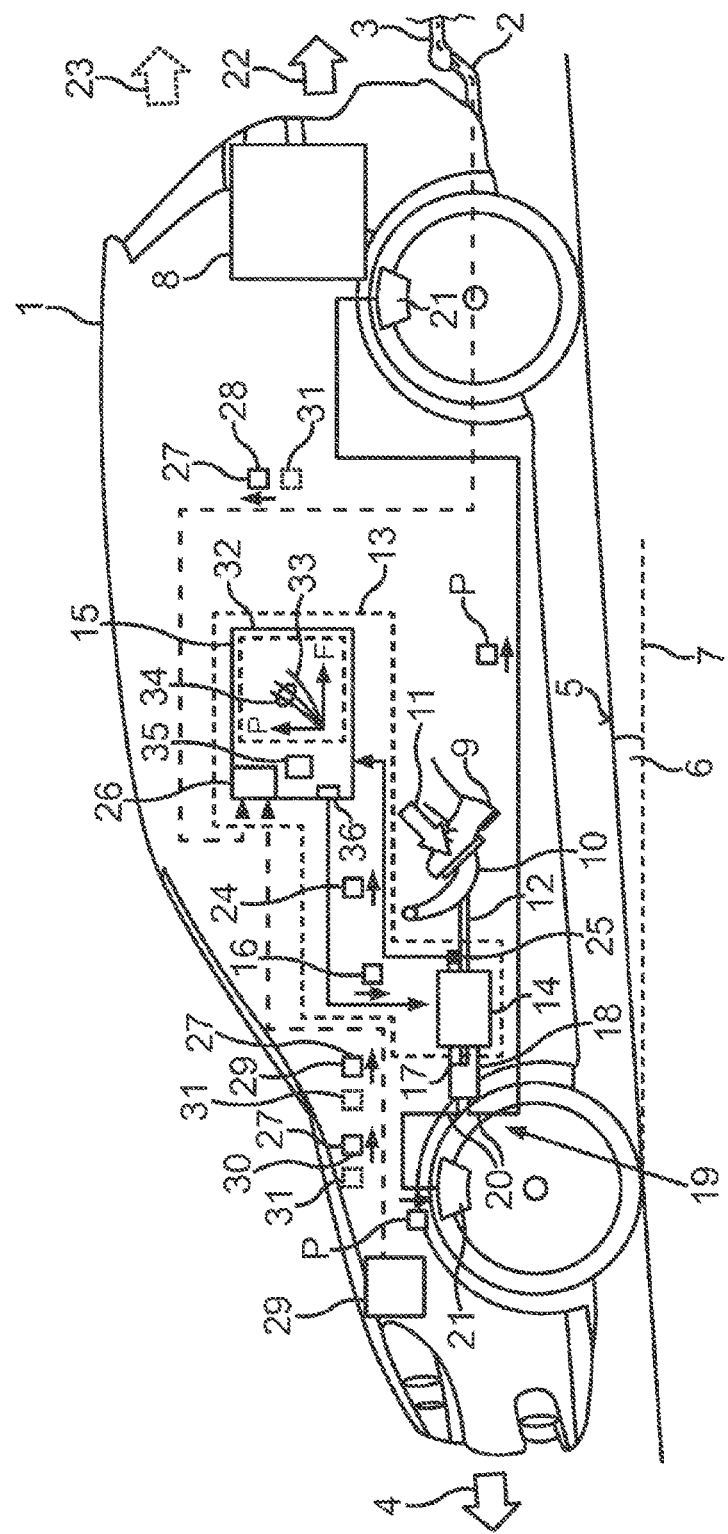

AUTOMATIC ADAPTATION OF BRAKE BOOST TO DIFFERENT BRAKING LOADS

PRIORITY CLAIM

This patent application is a U.S. National Phase of International Patent Application No. PCT/EP2016/070503, filed 31 Aug. 2016, which claims priority to German Patent Application No. 10 2015 217 905.2, filed 18 Sep. 2015, the disclosures of which are incorporated herein by reference in their entireties.

SUMMARY

Illustrative embodiments relate to a method for operating an electromechanical brake booster of a motor vehicle. For the purpose of controlling the brake booster, a pedal force on a brake pedal is ascertained and, depending on the pedal force, a brake pressure is set by the brake booster in such a manner that under normal conditions a predetermined standard deceleration of the motor vehicle results. Illustrative embodiments also provide a control device for controlling a brake booster, as well as a brake booster with the control device.

BRIEF DESCRIPTION OF THE DRAWINGS

In the following, an exemplary embodiment is described with reference to the drawing, in which:

FIG. 1 shows a schematic representation of an embodiment of the disclosed motor vehicle.

DETAILED DESCRIPTION

In electromechanical brake boosters nowadays a boosting characteristic for assisting the foot-brake force or pedal force of the driver is stored structurally. This boosting characteristic represents a compromise as regards the needs of the driver and the applicable statutory requirements. On the basis of the boosting characteristic, a deceleration performance results, as a function of the pedal force, which in the case of a predetermined vehicle weight on a level travel path yields a predetermined vehicle deceleration or decrease of speed which is designated herein as standard deceleration. However, for the same pedal force the vehicle deceleration varies if disturbance variables, such as, for instance, an additional loading of the vehicle, or a trailer, are present, or if the motor vehicle is on an inclined road.

A method for controlling a controllable electromechanical brake booster is known from DE 10 2009 047 122 A1. With this method, the vehicle is held at a standstill by the brake booster. So that, in this connection, electrical energy is not consumed unnecessarily for the purpose of operating the brake booster, the assisting force applied by the brake booster is reduced to a minimum, so that the vehicle will not be released from the standstill even in the case of diminished assisting force.

The disclosed embodiments diminish effects of disturbance variables, such as, for instance, an additional load of the vehicle, in the course of a braking event.

A method is provided for operating an electromechanical brake booster of a motor vehicle. By virtue of the method, during a rolling motion of the motor vehicle the travel speed thereof is decreased. For this purpose, a pedal force exerted on a brake pedal by a user is ascertained by a control device, and a brake pressure to be set is ascertained from the ascertained pedal force by an adjusting unit. The adjusting unit accordingly serves for assignment of pedal force to brake pressure. By operation of the brake booster, the brake pressure to be set is then set in friction brakes of the motor vehicle, and a vehicle deceleration, depending on the set brake pressure, of the motor vehicle is brought about in this way. In connection with the disclosure, "vehicle deceleration" is to be understood to mean a negative acceleration—that is to say, the diminution of the travel speed. The described adjusting unit has the ascertained pedal force as input value, and provides as output value the brake pressure to be set. The assignment of pedal force to brake pressure, resulting in this way, is defined in the state of the art, as a rule, by a boosting characteristic which represents a compromise for differing driving situations. Also in the case of the adjusting unit there is such a configuration which is designated herein as the standard configuration. If at least one predetermined disturbance variable has a standard value which is predetermined in the given case, in accordance with the standard configuration such a brake pressure to be set with reference to the pedal force is ascertained by which a predetermined standard deceleration of the motor vehicle is brought about. For instance, in the case of an unloaded vehicle without a trailer and on a level path (standard values of the disturbance variables constituted by loading, trailer and gradient), for given pedal force the standard deceleration is accordingly brought about. Of course, in this case the standard deceleration is a function of the pedal force—that is to say, differing force values of the pedal force yield differing deceleration values of the standard deceleration, because a greater pedal-force value yields a greater deceleration value than a smaller pedal-force value.

However, in the case of a loaded vehicle and/or with trailer and/or on a gradient, as a rule the driver has to reckon with the fact that for the same pedal force the standard deceleration does not result, but rather the motor vehicle reacts more sluggishly. With the disclosed method, this effect is now compensated entirely or at least partially. For this purpose, there is provision that the adjusting unit has at least one adjusting parameter for setting a compensation configuration different from the standard configuration. The configurations consequently arise by virtue of the respective value of the at least one adjusting parameter. By a capture device, a respective actual value of the at least one disturbance variable is captured. The compensation configuration is as a function of a respective difference of each ascertained actual value from the respective standard value of the at least one adjusting parameter, is set by setting the at least one adjusting parameter. In this connection, the difference does not have to be calculated explicitly. There may also be provision to set the respective parameter value of the at least one adjusting parameter directly as a function of the respective actual value of the at least one disturbance variable. In this case, the dependence on the difference between actual value and standard value likewise arises.

In the motor vehicle, the adjusting unit reacts to the at least one disturbance variable, by an actual value being captured with reference to each disturbance variable and by each captured actual value being taken into consideration in the course of ascertaining the brake pressure to be set. Accordingly, not only has one the standard configuration been restricted but a compensation configuration may also be set. Accordingly, the vehicle deceleration can be adapted to the current loading of the motor vehicle during the journey.

The disclosure also encompasses optional further developments, by virtue of the characteristics of which additional benefits arise.

In connection with the compensation configuration, there may be provision to compensate for the influence of the disturbance variables on the vehicle deceleration. According to a further development, therefore, such a compensation configuration is set in which the vehicle deceleration exhibits a smaller deviation from the standard deceleration—that is to say, a smaller difference from the standard deceleration than in the standard configuration—if the respective actual value of the at least one disturbance variable deviates from the respective standard value. Accordingly, if the at least one adjusting parameter is not set, so that the standard configuration is retained in the adjusting unit, the motor vehicle undergoes a slighter vehicle deceleration in the case of loading and/or with trailer and/or in the case of gradient than results with the compensation configuration. Consequently, irrespective of loading for given pedal force, the driver is always provided with the standard deceleration or at least with a greater vehicle deceleration than with the standard configuration.

At least one disclosed embodiment takes the loading of the motor vehicle into consideration as disturbance variable. In this further development, the at least one disturbance variable comprises the loading of the motor vehicle, and the current loading of the motor vehicle is captured as actual value. In other words, a weight or mass of the cargo or load or freight in the motor vehicle, for instance, is ascertained. This can be carried out, for instance, by sensors of the automatic cruise control (ACC) or of the electronic stability control (ESC). For instance, a compression travel of at least one shock-absorber of the motor vehicle can be ascertained, and, depending on the compression travel, the weight or mass of the loading can be inferred. The loading can, for example, be made available by the respective control instrument of the ACC or ESC.

According to a further development, the at least one disturbance variable comprises a trailer load, attached to the motor vehicle, of a trailer, and the current trailer load is captured as actual value. The trailer load may be specified by, for instance, the weight or mass of the trailer and/or a build model of the trailer. The trailer load can, for instance, be ascertained by a trailer control instrument provided in the trailer.

According to a further development, the at least one disturbance variable comprises a gradient of a subsurface over which the motor vehicle is rolling. An inclination value correlated with the current gradient is ascertained as actual value. In other words, the inclination of the ground or the gradient of the road is captured. This can, for instance, be ascertained indirectly via the inclination of the vehicle, in which case inherent pitching motions of the motor vehicle with respect to the ground are to be compensated, for instance, by averaging, or removed by calculation. The gradient of the subsurface being driven on can also, for instance, be ascertained on the basis of a digital road map in which the gradient of the road and/or altitude data is/are also contained. By the gradient of the ground being taken into consideration, the increased thrust in the course of traveling downhill is also taken into consideration when setting the brake pressure.

According to a further development, the respective actual value is captured cyclically by the capture device, and the at least one adjusting parameter is correspondingly set cyclically. In other words, the assignment of pedal force to brake pressure by the adjusting unit is adapted cyclically to the respective current actual value of the at least one disturbance variable. Hence the assignment behavior of the adjusting unit is adapted by a closed-loop control.

A further development is based on the known approach of providing the brake pressure by a boosting characteristic. In this case, to also enable the adaptation to the actual values of the disturbance variables, this further development provides that the standard configuration is provided in the adjusting unit by a first boosting characteristic, and at least one further boosting characteristic is provided for a respective compensation configuration. Depending on the respective captured actual value of the at least one disturbance variable, the system switches between the boosting characteristics. In this way, in each instance that boosting characteristic is then activated or used as a basis for ascertaining the brake pressure to be set, by virtue of which the standard deceleration results at predetermined pedal force, even though the disturbance variables do not have the respective standard value. The boosting characteristic of the standard configuration is set if the respective actual value of the at least one disturbance variable corresponds to the respective standard value. In this connection, tolerance intervals may of course also have been provided.

The disclosure also encompasses a control device for an electromechanical brake booster. The control device exhibits a signal input, for receiving the respective actual value of the at least one disturbance variable, and a signal output, for controlling an electric drive unit of the brake booster. The control device has been set up to implement an embodiment of the disclosed method. In this way, the control device generates, as a function of each received actual value at the signal output, a control signal for the drive unit of the brake booster, by which the standard deceleration is set for corresponding pedal force, even if the at least one disturbance variable does not have the respective standard value.

The disclosure also encompasses an electromechanical brake booster that exhibits an embodiment of the disclosed control device.

Finally, the disclosure also encompasses a motor vehicle that exhibits an embodiment of the disclosed brake booster. Furthermore, a capture device is provided for capturing a respective actual value of at least one interference variable, the capture device being coupled with the signal input of the control device of the brake booster, so that the respective captured actual value can be transferred to the control device.

The disclosed motor vehicle may be configured as an automobile, in particular, as a passenger car or a truck.

In the exemplary embodiment, the described components of the embodiment each represent individual features of the disclosed embodiments that are to be considered independently of one another and that also each develop the disclosure further, independently of one another, and therefore are also to be regarded, individually or in a combination other than the one shown, as integral parts of the disclosure. Furthermore, the described embodiment can also be supplemented by further features that have already been described.

The FIGURE shows a motor vehicle 1 which may be, for instance, an automobile, in particular, a passenger car or a truck. A trailer 3 (not represented in any detail) may have been attached to a trailer hitch 2 of the motor vehicle 1. In the example shown, the motor vehicle 1 is traveling at a travel speed 4 over a travel subsurface 5. For instance, the motor vehicle 1 may be rolling downhill. In other words, the travel subsurface 5 exhibits a gradient 6 which, for instance, may have been defined as an inclination of the ground or as an angle with respect to a horizontal 7. The motor vehicle 1 may furthermore be loaded—that is to say, a temporary or removable load or cargo 8 may be located in a loading compartment or on a loading area of the motor vehicle 1.

In the example shown, a driver 9 would like to decrease the travel speed 4 of the motor vehicle 1. Only one foot of the driver 9 is represented in the FIGURE. For the purpose of braking or decreasing the travel speed 4, the driver 9 exerts a pedal force 11 on a brake pedal 10 with his/her foot. In other words, the driver 9 subjects the brake pedal 10 to the foot force or pedal force 11.

The pedal force 11 can be transferred into an electromechanical brake booster 13 via a piston rod 12. Here an electric drive unit 14 acts additionally on the piston rod 12. The drive unit 14 may exhibit, for instance, an electric motor which, for instance, acts on the piston rod 12 via a worm gear. In this way, the pedal force 11 is boosted. The drive unit 14 may be controlled by a control device 15 which for this purpose generates a control signal or adjusting signal 16 for the drive unit 14. The control device 15 may comprise a microcontroller or microprocessor, for instance.

The boosted pedal force can be transferred into a master cylinder 18 of a hydraulic brake circuit 19 via a push-rod 17. In this way, in hydraulic brake lines 20 a brake pressure P is set which acts, in a manner known as such, in friction brakes 21 of the motor vehicle 1. By the friction brakes 21, a vehicle deceleration 22 is brought about which decreases the vehicle speed 4.

In the case of an unloaded motor vehicle 1—that is to say, without the cargo 8 and without the trailer 3—on a level travel subsurface the driver 9 here can obtain a predetermined standard deceleration 23—that is to say, a predetermined negative acceleration value—for a given value of the pedal force 11. For this purpose the control device 15 sets the adjusting signal 16 as a function of a sensor signal 24. The sensor signal 24 is generated by a sensor 25 which, on the piston rod 12, for instance, captures or ascertains the pedal force 11.

The control device 15 may exhibit an adjusting unit 32, by virtue of which the described assignment of pedal force to brake pressure results—that is to say, an assignment of the force value F of the brake force 11 to the brake pressure P to be set. The adjusting unit 32 may have been realized, for instance, by a program module of the control device 15. The control device 15 may have been realized, for instance, by a control instrument. With reference to the trailer weight of the trailer 3, the loading weight of the load 8, and the gradient value of the gradient 6, in each instance a standard value 31 is provided, for which the standard deceleration 23 results for given pedal force 11. In this case, given standard values 31 the standard deceleration 23 is brought about by a boosting characteristic 33 which represents a standard characteristic 33. If this standard characteristic 33 is being used, the control device 15 is in a standard configuration. The respective standard value 31 may, for example, state or specify that the load amounts to 0 kilograms, no trailer has been coupled on, and no gradient is present (inclination 0 degrees). The standard characteristic 33 represents a standard configuration of the adjusting unit 32.

By virtue of the cargo 8 and the trailer 3 and the gradient 6, the motor vehicle 1 behaves more sluggishly. In other words, the cargo 8, the trailer 3 and the gradient 6 each represent a disturbance variable, by virtue of which, given identical pedal force 11, the standard deceleration 23 would not result if the adjusting signal 16 were not adapted by the control device 15.

To generate for given pedal force 11, that is to say, for given value of the sensor signal 24, an adjusting signal 16 adapted to the disturbance variables, in the case of which the disturbance variables have been compensated, in the motor vehicle 1 the control device 15 additionally receives, via a signal input 26, a respective actual value 27 relating to at least one of the disturbance variables.

For instance, from a trailer control instrument (not represented) of the trailer 3, as actual value 27 a trailer weight 28 and/or a trailer model can be received as actual value. From a control instrument 29 for an ACC (automatic cruise control) or for an ESC (electronic stability control), a loading weight 29 of the load 8 and/or a gradient value 30 of the gradient 6 of the travel subsurface 5, for instance, can be received as actual value 27. The gradient value 30 may be, for example, an angle value of an angle of the surface of the travel subsurface 5 with respect to the horizontal 7.

For the purpose of bringing about the standard deceleration 23, even in the case of load 8 and/or attached trailer 3 and/or in the case of gradient 6, depending on the actual values 27 of these disturbance variables different boosting characteristics 34 are required in each instance. These can be activated in the adjusting unit 32 by the control device 15. The additional boosting characteristics 34 each represent a compensation configuration.

Which of the characteristics 33, 34 in the adjusting device 32 has been activated—that is to say, is utilized for the purpose of ascertaining the brake pressure P to be set—can be established by an adjusting parameter 35 which is changed or set as a function of the actual values 27. The adjusting parameter 35 accordingly establishes the active boosting characteristic 33, 34. In this way, a boosting characteristic 33, 34 is always active, by virtue of which, for given actual values 27, a vehicle deceleration 22 results that is as similar as possible to the standard deceleration 23 for given pedal force 21.

The control signal 16 is then generated by the control device 15 as a function of the brake pressure P to be set as ascertained on the basis of the boosting characteristic 33, 34 that is active in the given case. The adjusting signal 26 is provided at a signal output 36. The drive unit 14 then generates the brake pressure P in the brake lines 20, so that the vehicle deceleration 22 results.

The shape and/or number of the additional boosting characteristics 34 and the dependence between actual values 24 with reference to the boosting characteristics 34 to be selected can be ascertained, for instance, by simple experiments or on the basis of equations that specifies the resulting vehicle deceleration 22 as a function of the disturbance variables constituted by loading, trailer load and gradient. These equations are known as such.

With the identification of the stated disturbance variables, a switching of the brake-force boosting can accordingly occur automatically, so that for a desired standard deceleration 23 the brake-pedal force to be employed remains the same. By virtue of the adaptation, the deceleration of the motor vehicle 1 always behaves independently of the loading and nominally with reference to the design of the braking system. That is, for each value of the pedal force 11 the respectively associated value for the standard deceleration 23 arises. The disturbance variables can be identified by already existing functions of the motor vehicle 1 that are able to transmit the status to other receiver control instruments, for instance, via a communication bus, for instance, a CAN bus (CAN—controller area network), and hence also to the control device 15 of the brake booster 13.

Consequently, in the course of dynamic braking in all driving situations (inclination/gradient) and in the case of differing loading, a relationship between pedal force and vehicle deceleration that is always the same can always be provided or ensured for the driver during the journey.

Overall, the example shows how an automatic adaptation of the brake-force boosting to differing brake loads can be provided by the disclosure.

LIST OF REFERENCE SYMBOLS 1 motor vehicle
2 trailer hitch
3 trailer
4 travel speed
5 travel subsurface
6 gradient
7 horizontal plane
8 load
9 driver
10 brake pedal
11 pedal force
12 piston rod
13 brake booster
14 drive unit
15 control device
16 control signal
17 push-rod
18 master cylinder
19 hydraulic braking system
20 brake line
21 friction brakes
22 vehicle deceleration
23 standard deceleration
24 sensor signal
25 sensor
26 signal input
27 actual value
28 trailer load
29 loading weight
30 gradient value
31 standard value
32 adjusting unit
33 standard characteristic
34 boosting characteristic
35 adjusting parameter
36 adjusting output
F force value
P brake pressure

The invention claimed is:

1. A method for operating an electromechanical brake booster of a transportation vehicle, during a rolling motion of the transportation vehicle, to decrease a travel speed of the transportation vehicle, the method comprising:
capturing, by a sensor under control of a control device, a pedal force exerted on a brake pedal by a user;
ascertaining, by an adjusting unit under control of the control device, a brake pressure to be set in the friction brakes of the transportation vehicle based on the captured pedal force; and
setting, by the brake booster under control of the control device, the brake pressure to cause a vehicle deceleration of the transportation vehicle that is dependent on the set brake pressure,
wherein the adjusting unit has a standard configuration in which the adjusting unit ascertains, with reference to the captured pedal force, the brake pressure to be set to cause a predetermined standard deceleration of the transportation vehicle, which is performed in response to at least one predetermined disturbance variable having a predetermined standard value, wherein the at least one predetermined disturbance variable changes the deceleration of the transportation vehicle for a given pedal force,
wherein the adjusting unit uses at least one adjusting parameter for setting a compensation configuration different from the standard configuration,
wherein an actual value of at least one disturbance variable is captured cyclically by a capture device and the at least one adjusting parameter is set cyclically prior to receipt of a braking request from the user in a closed loop, and
wherein the compensation configuration is set as a function of a respective difference of each captured actual value from the predetermined standard value, by setting the at least one adjusting parameter of the adjusting unit.

2. The method of claim 1, wherein in response to the actual value of the at least one disturbance variable deviating from a standard value, the compensation configuration is set in which the vehicle deceleration exhibits a smaller deviation from the standard deceleration than in the standard configuration.

3. The method of claim 1, wherein the at least one disturbance variable comprises a loading of the transportation vehicle, and current loading of the transportation vehicle is captured as the actual value.

4. The method of claim 1, wherein the at least one disturbance variable comprises a trailer load of a trailer attached to the transportation vehicle, and a current trailer load is captured as the actual value.

5. The method of claim 1, wherein the at least one disturbance variable comprises a gradient of a travel subsurface over which the transportation vehicle is rolling, and an inclination value correlated with a current gradient is ascertained as the actual value.

6. The method of claim 1, wherein the standard configuration in the adjusting unit is provided by a boosting characteristic, and at least one further boosting characteristic for the compensation configuration is provided, and switching between the boosting characteristics is performed as a function of the captured actual value of the at least one disturbance variable.

7. A control device for an electromechanical brake booster of a transportation vehicle, wherein the control device comprises:
a signal input for receiving an actual value of at least one disturbance variable; and
a signal output for controlling an electric drive unit of the electromechanical brake booster,
wherein the control device implements a method for operating the electromechanical brake booster of the transportation vehicle during a rolling motion of the transportation vehicle to decrease a travel speed of the transportation vehicle, the method comprising the control device:
capturing, by a sensor, a pedal force exerted on a brake pedal by a user;
ascertaining, by an adjusting unit, a brake pressure to be set in friction brakes of the transportation vehicle based on the captured pedal force; and
setting, by the electromechanical brake booster, the brake pressure to cause a vehicle deceleration of the transportation vehicle that is dependent on the set brake pressure,
wherein the adjusting unit has a standard configuration in which the adjusting unit ascertains, with reference to the captured pedal force, the brake pressure to be set to cause a predetermined standard deceleration of the transportation vehicle, which is performed in response to at least one predetermined disturbance variable having a predetermined standard value, wherein at least one predetermined disturbance variable changes the vehicle deceleration for a given pedal force, wherein the adjusting unit has at least one adjusting parameter for setting a compensation configuration different from the standard configuration, wherein an actual value of the at least one disturbance variable is captured cyclically by a capture device and the at least one adjusting parameter is set cyclically prior to receiving a braking request from the user in a closed loop, and wherein the compensation configuration is set as a function of a respective difference of each captured actual value from the predetermined standard value, by setting the at least one adjusting parameter of the adjusting unit.

8. The electromechanical brake booster including the control device of claim 7.

9. The transportation vehicle with the electromechanical brake booster of claim 8 and further including the capture device for capturing the actual value of at least one disturbance variable, wherein the capture device is coupled with the signal input of the control device of the brake booster.

10. The control device of claim 7, wherein in response to the actual value of the at least one disturbance variable deviating from the standard value, the compensation configuration is set in which the vehicle deceleration exhibits a smaller deviation from the standard deceleration than in the standard configuration.

11. The control device of claim 7, wherein the at least one disturbance variable comprises a loading of the transportation vehicle, and a current loading of the transportation vehicle is captured as the actual value.

12. The control device of claim 7, wherein the at least one disturbance variable comprises a trailer load of a trailer, attached to the transportation vehicle, and a current trailer load is captured as the actual value.

13. The control device of claim 7, wherein the at least one disturbance variable comprises a gradient of a travel subsurface over which the transportation vehicle is rolling, and an inclination value correlated with a current gradient is ascertained as the actual value.

14. The control device of claim 7, wherein the standard configuration in the adjusting unit is provided by a boosting characteristic, and at least one further boosting characteristic for a respective compensation configuration is provided, and switching between the boosting characteristics is performed based on the captured actual value of the at least one disturbance variable.

* * * * *